United States Patent [19]
Yates et al.

[11] Patent Number: 5,318,383
[45] Date of Patent: Jun. 7, 1994

[54] CLOSED-LOOP AUTOMATED WASTE PROCESSING SYSTEM AND METHOD

[75] Inventors: William A. Yates, Yorba Linda, Calif.; Jon N. Leonard, Greenville, S.C.

[73] Assignee: Hughes Aircraft Company, Los Angeles, Calif.

[21] Appl. No.: 846,185

[22] Filed: Mar. 4, 1992

[51] Int. Cl.$^5$ .............................................. B09B 1/00
[52] U.S. Cl. ..................... 405/129; 588/249
[58] Field of Search ........... 405/128, 129, 258; 588/249, 251, 259

[56] References Cited

U.S. PATENT DOCUMENTS

| | | | |
|---|---|---|---|
| 4,781,944 | 11/1988 | Jones | 405/129 X |
| 4,897,221 | 1/1990 | Manchak | 405/128 X |
| 4,993,873 | 2/1991 | Tippmer | 405/128 |
| 5,024,770 | 6/1991 | Boyd et al. | 405/129 X |

Primary Examiner—David H. Corbin
Attorney, Agent, or Firm—Terje Gudmestad; W. K. Denson-Low

[57] ABSTRACT

A method for controlling a closed-loop processing system (100) including the steps of receiving and analyzing an element to be processed to identify the contents thereof. The method further includes the steps of processing and converting the element into a residue which is stabilized, to prevent physical interaction therewith, and then deposited in a permanent landfill storage facility (124). Finally, a plurality of parameters of the residue and the environment surrounding the closed-loop processing system (100) are monitored to provide a plurality of control signals. The control signals are utilized to control each stage of the processing system to ensure a negligible environment effect. Thus, the invention provides a method for controlling a processing system in a closed-loop automated manner with negligible environmental impact. In a preferred embodiment, the closed-loop automated system (100) for processing waste of the present invention receives and analyzes waste. The waste is thereafter incinerated or biodecontaminated for conversion into a residue or is chemically processed for reclamation. The residue is then stabilized and stored to prevent physical interaction therewith. Thereafter, a plurality of monitoring devices (154) are employed for automatically measuring and sensing parameters and controlling the closed-loop waste processing system (100).

20 Claims, 4 Drawing Sheets

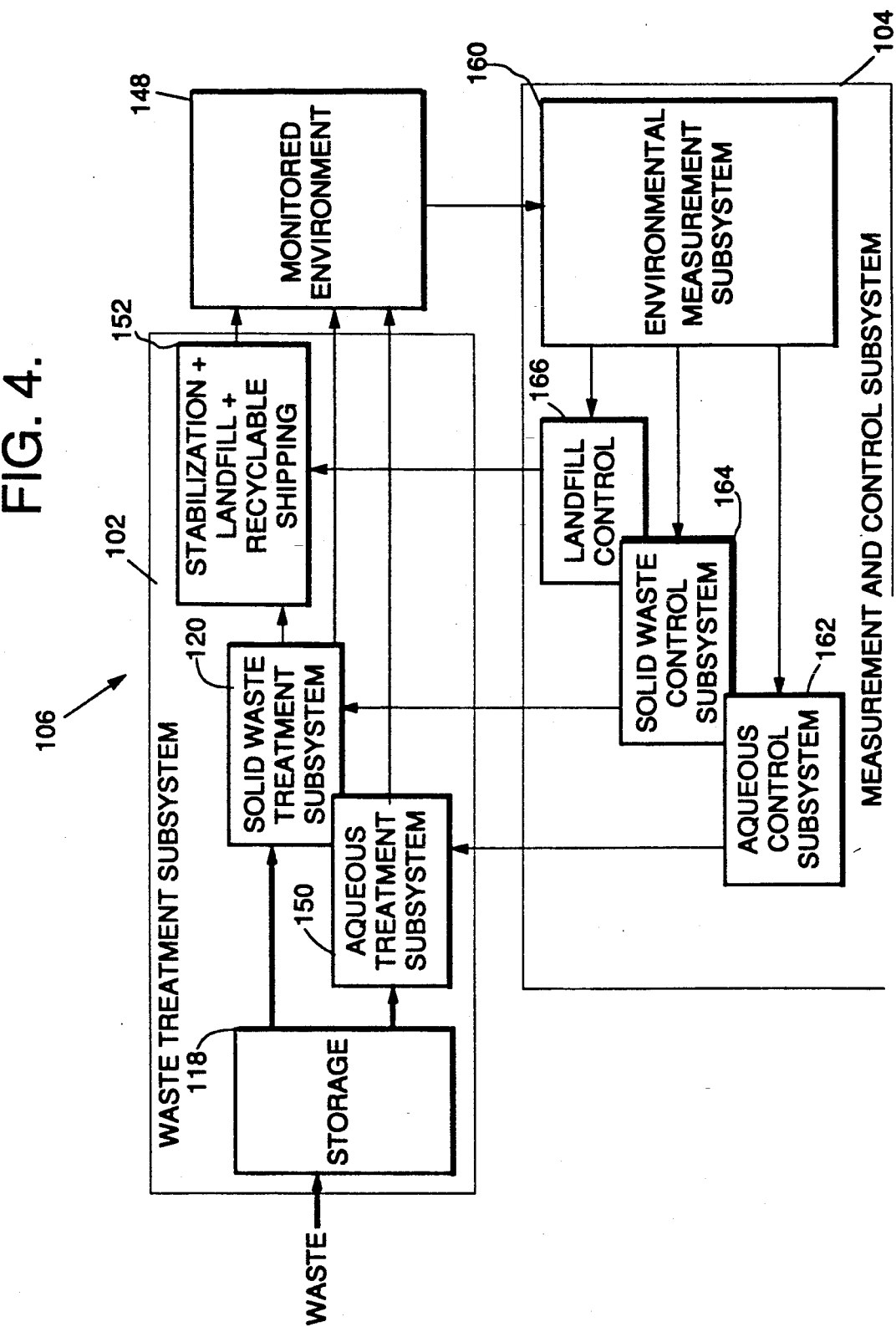

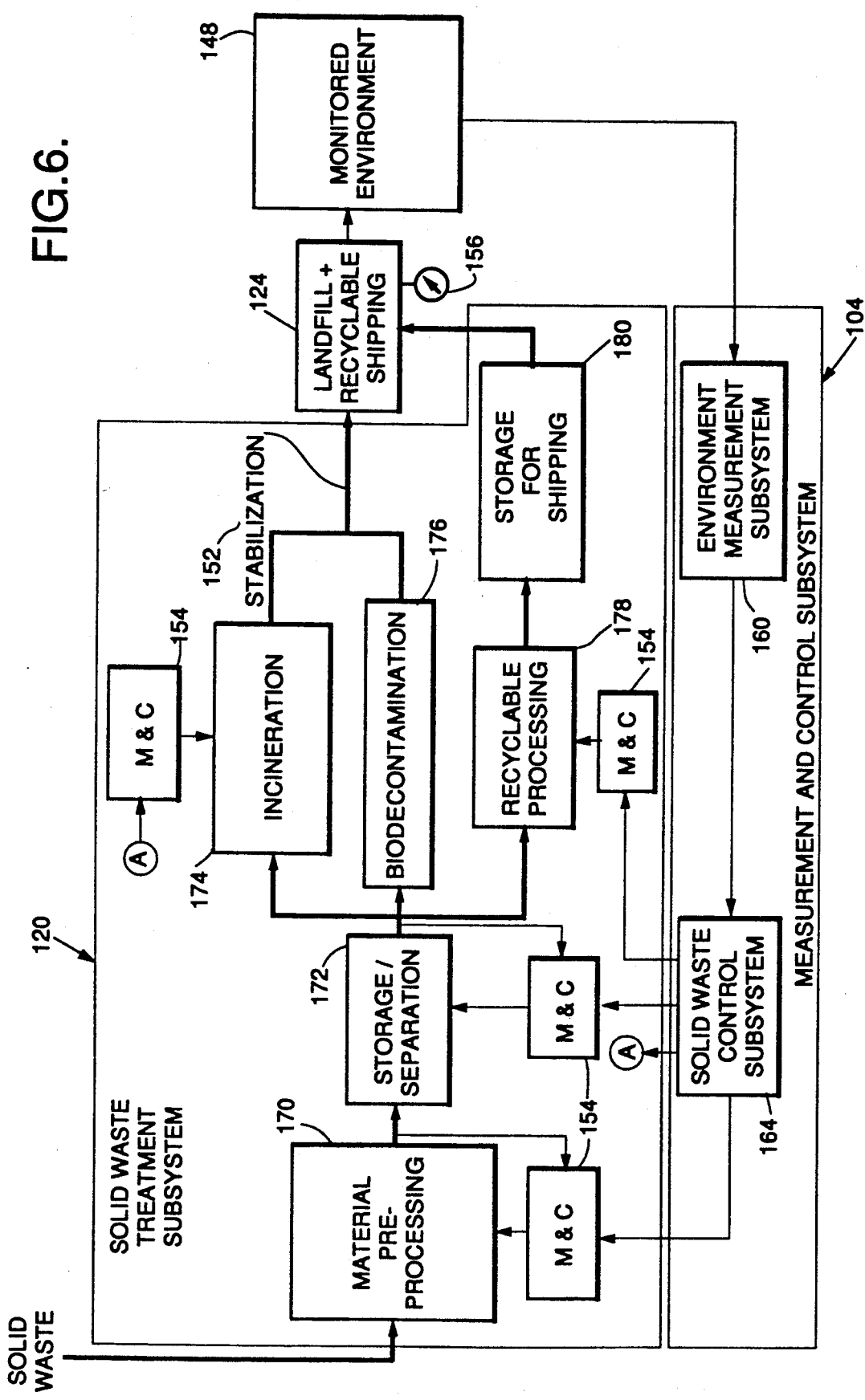

CLOSED-LOOP AUTOMATED WASTE PROCESSING SYSTEM AND METHOD

BACKGROUND OF THE INVENTION

1. Field of the Invention

The present invention relates to waste processing systems. More specifically, the present invention relates to methods and apparatus for waste processing which produces negligible environmental impact.

While the present invention is described herein with reference to illustrative embodiments for particular applications, it should be understood that the invention is not limited thereto. Those having ordinary skill in the art and access to the teachings provided herein will recognize additional modifications, applications and embodiments within the scope thereof and additional fields in which the present invention would be of significant utility.

2. Description of the Related Art

Waste processing has become a serious environmental concern. Two major categories of waste include residential waste and industrial waste. Because of immediate environmental concerns, industrial waste processing has become a high priority with federal, state and local governments and the industrial community as well.

Generally, industrial waste includes solid waste, aqueous or liquid waste and air particulate waste that is often a by-product of a process of solid and liquid waste disposal. The primary method of industrial waste disposal has heretofore included the application of discrete apparatus. Utilization of the discrete apparatus often involved the use of instrumentation including various meters and gauges, for example, temperature meters and pressure gauges. The discrete apparatus and relevant instrumentation were serviced manually and thus the entire process was prone to error.

Each classification of industrial waste presents unique environmental problems. Solid waste can be directed to a landfill site having a monitoring system for identifying emissions and determining the environmental status of the site. Notwithstanding the use of such monitoring systems, waste water resulting from precipitation might cause toxic elements of the solid industrial waste to leech into the soil and eventually the underground water table. This results in or threatens ecological damage to the environment.

As an alternative, solid and liquid industrial waste is often incinerated. Many known incineration waste disposal systems incorporate control methods based on design calculations in lieu of physical monitoring. The calculations generally attempt to minimize the output flux from the incineration disposal system. After the design and test stages, it has been customary to seek approval of the Environmental Protection Agency (EPA) for the incineration waste disposal system.

Several problems exist with this type of incineration system. The first problem is that of verifying the nature of the waste being incinerated. In certain cases, incineration of the industrial waste may not be the proper method of waste disposal. Yet, validation of the nature of the industrial waste on the input side of the incinerator is virtually non-existent. Typically, at best, only those inserting the industrial waste into the input side of the incinerator system actually know the nature of the waste being deposited.

Further, even if EPA approval is obtained for usage of the incineration waste disposal system, regulatory requirements are often not observed resulting in unknown levels of emissions.

Similar problems occur with the incineration of liquid waste. Verification of the actual chemical composition of the waste is very important as incineration of certain chemicals may result in fires, explosions and toxic spills into the soil and underground water table.

Thus, there is a need in the art for improvements in industrial waste processing which ensure a negligible impact on the environment.

SUMMARY OF THE INVENTION

The need in the art is addressed by the closed-loop automated waste processing system and method of the present invention. The invention is a method for controlling a closed-loop processing system including the steps of receiving and analyzing an element to be processed to identify the contents thereof. The method further includes the steps of processing and converting the element into a residue which is stabilized, to prevent physical interaction therewith, and then deposited in a permanent landfill storage facility. Finally, a plurality of parameters of the residue and the environment surrounding the closed-loop processing system are monitored to provide a plurality of control signals. The control signals are utilized to control each stage of the processing system to ensure a negligible environment effect. Thus, the invention provides a method for controlling a processing system in a closed-loop automated manner with negligible environmental impact.

In a preferred embodiment, the closed-loop automated system for processing waste of the present invention receives and analyzes waste. The waste is thereafter incinerated or biodecontaminated for conversion into a residue or is chemically processed for reclamation. The residue is then stabilized and stored to prevent physical interaction therewith. Thereafter, a plurality of monitoring devices are employed for automatically measuring and sensing parameters and controlling the closed-loop waste processing system.

BRIEF DESCRIPTION OF THE DRAWINGS

FIG. 4 is a more detailed block diagram of the waste treatment subsystem control inner loop of FIG. 2 showing the waste treatment subsystem and the measurement and control subsystem for solid waste, aqueous waste and landfill applications.

FIG. 6 is a more detailed block diagram of the solid waste subsystem of the waste treatment subsystem control inner loop of FIG. 4 illustrating the various methods by which solid waste is processed by the solid waste treatment subsystem.

DESCRIPTION OF THE INVENTION

Figure 1:
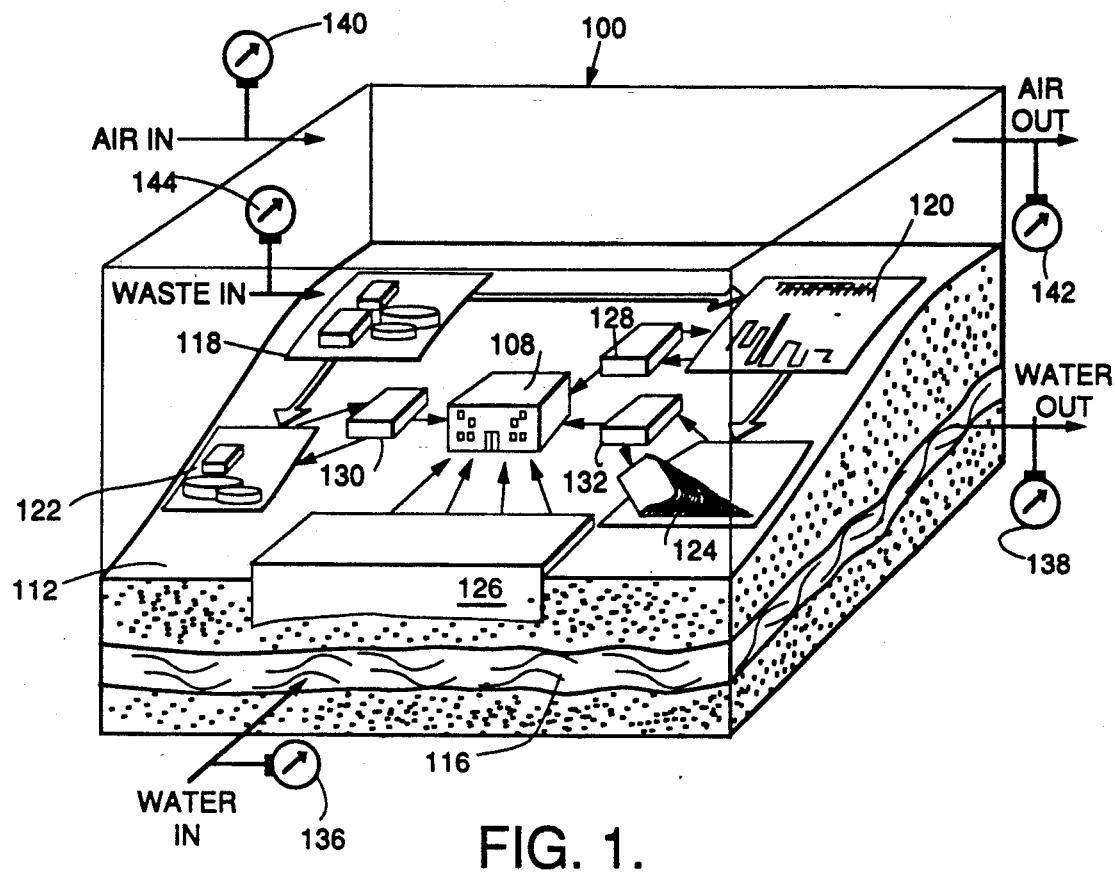
FIG. 1 is a simplified perspective view, partly in cross-section, of an illustrative embodiment of a closed-loop automated waste processing system of the present invention in a typical environmental setting.
Figure 2:
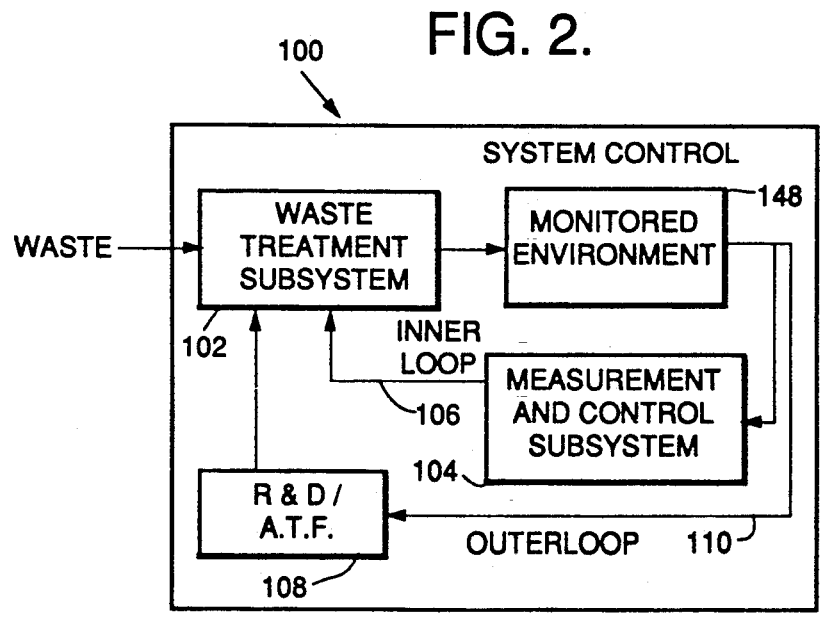
FIG. 2 is a simplified block diagram of a waste treatment subsystem control associated with the closed-loop automated waste processing system of FIG. 1 showing an inner loop and an outer loop.

As shown in drawing FIGS. 1 and 2 for purposes of illustration, the invention is embodied in a closed-loop automated waste processing system 100 of the type having a waste treatment subsystem 102 and a measurement and control subsystem 104 which form an inner loop 106 for controlling the processing system 100 and an advanced technical facility 108 forming an outer loop 110 for monitoring the effects of the processing system 100 on the surrounding environment and for initiating required system modifications.

In the past, the primary method of industrial waste disposal included the application of discrete apparatus which utilized relevant instrumentation such as temperature meters and pressure gauges. The discrete apparatus and relevant instrumentation were serviced manually and thus the entire process was prone to error. Each classification of industrial waste presents unique environmental problems. Notwithstanding a monitoring system, waste water resulting from precipitation might cause toxic elements of solid industrial waste to leech into the soil and eventually the underground water table. This results in or threatens ecological damage to the environment. Disposing of solid or liquid waste by incineration creates several problems which include verifying the nature of the waste and the toxic or explosive character thereof and enforcing regulatory emission and leakage rules.

In accordance with the present invention shown in FIGS. 1 and 2, the measurement and control subsystem 104 cooperates with the waste treatment subsystem 102 to feed back data on specified parameters indicative of the status of the treated industrial waste and the condition of the environment surrounding the waste processing system 100. This cooperation ensures optimum control of the waste treatment subsystem 102 within the inner loop 106. Moreover, the technical facility 108 monitors the condition of the immediate environment and provides the waste treatment subsystem 102 with data designed to further optimize the impact on the surrounding environment.

The waste processing system 100 of the present invention is situated on an industrial processing site 112 as shown in FIG. 1. The subsoil 114 and an underground aquifer 116 also appear on that part of FIG. 1 shown in cross-section. Components of the waste processing system 100 located upon the processing site 112 include a waste storage facility 118, a solid waste treatment subsystem 120, an aqueous treatment subsystem 122 and a landfill facility 124. Located at the center of the processing site 112 is the technical facility 108 which receives environmental parameter information from an environmental monitoring station 126. The technical facility 108 also communicates With the solid waste treatment subsystem 120, the aqueous treatment subsystem 122 and the landfill facility 124 via a plurality of control substations 128, 130 and 132, respectively.

A significant feature of the present invention is that the conditions of each of the environmental constituents air, ground water (e.g., aquifer) and soil are monitored by instrumentation. Thereafter, the monitored parameters are utilized to control the waste treatment subsystem 102. The metering instrumentation shown in FIG. 1 is meant to be symbolic of actual monitoring devices incorporated into the processing system 100 and the processing site 112. By way of example and not by limitation, appropriate water purity instrumentation is indicated by a water-in meter 136 and a water-out meter 138. Each water meter 136 and 138 is employed to measure the water quality in the soil, in the aquifers 116 and on the ground surface.

Air monitoring instrumentation is indicated by an air-in meter 140 and an air-out meter 142. Each of the air meters 140 and 142 monitor the air quality to maintain an ambient air environment which is negligibly effected by the waste processing operation. An example of an acceptable air monitoring device includes a gas spectrometer utilized to study the constituent matter in air. Another exemplary embodiment of detecting and identifying air pollution generated by the processing system 100 includes the use of infrared spectrometry. The absorption of infrared waves by constituent matter permits identifying the chemicals that exit a smokestack. Various vehicles can be employed to effectively employ infrared spectrometry including a satellite. Other known air turbulence monitoring devices can be employed to determine the direction of the prevailing winds. It is the function of each of the environmental monitoring devices to maintain an ambient environment on the processing site 112.

Additional instrumentation indicated by a waste-in meter 144 shown in FIG. 1 is strategically positioned to measure selected parameters of the form of waste being deposited in the waste processing system 100. The waste being processed is industrial waste which may include hazardous forms of solid and liquid carcinogens. Examples of solid waste include solidified by-products from a manufacturing process. Common liquid industrial waste can include, for example, solvents, viscous liquids, slurries such as pumpable sludge as a by-product from, for example, a paint factory, and other mixtures having different viscous profiles.

The closed-loop automated waste processing system 100 shown in block diagram form in FIG. 2 illustrates the inner loop 106 and the outer loop 110. The inner loop 106 includes the waste treatment subsystem 102, a monitored environment 148 which represents the monitored environmental parameters of air, water and soil conditions, and the measurement and control subsystem 104. The outer loop 110 includes the waste treatment subsystem 102, the monitored environment 148 and the technical facility 108.

The general function of the inner loop 106 is to monitor and control those processes that occur within the active elements of the processing system 100 such as temporary storage, incineration, biodecontamination, stabilization and permanent deposit. The monitoring of these processes generates a set of control signals which are fed-back from the measurement and control subsystem 104 to the waste treatment subsystem 102. The feedback control signals within the inner loop 106 are utilized to modify the operation of the processing system 100 to maintain the system environmental effect constantly optimum. Therefore, one of the many advantages of the present invention is that the processing system 100 is designed to be a closed-loop automated system in which the feedback control signals serve to close a control loop between the surrounding environment and the processing system. Further, the closed-loop system is entirely automatic requiring little or no external intervention.

The outer loop 110 serves a function directed to another end. That function is the monitoring of the surrounding environment of the processing site 112. The environmental parameters of air, water and soil are monitored in and about the processing site 112 including the areas accommodating temporary waste storage, incineration, biodecontamination, stabilization and permanent deposit. Thus, the outer loop 110 is directed to monitoring those activities which occur in the environment external to the processing plant 100. By incorporating the inner loop 106 with the outer loop 110, the status of the processing plant 100 can be monitored and controlled while simultaneously minimizing the long term effect on the surrounding environment. A further advantage of the present invention is that this combination reduces the operating and social costs associated with the major problem of industrial waste processing by maintaining the air, water and soil conditions at ambient.

The industrial waste is delivered to the waste processing system 100 in a variety of solid or liquid forms including solidified by-products, organic and inorganic solids, sludge, oil, hazardous waste solvents, viscous liquids, slurries and the like. The waste storage facility 118 shown in FIG. 1 includes a series of bins and storage tanks for receiving the various forms of waste. Further, additional instrumentation is employed for identifying the type of waste and for measuring the conditions and parameters associated therewith.

The function of the waste storage facility 118 is to temporarily hold the waste until the correct mix or quantity is obtained for subsequent waste treatment. For example, if subsequent waste treatment is by incineration, the correct mix would be that combination of solids and liquids that would fuel the incineration process. If the solid waste was a petroleum by-product, a solvent would be required to serve as a fuel for the incineration process. However, if there is no solvent available having a high specific heat, it may be necessary to use a gas. The correct mix of waste materials is important since the time order of waste constituents necessary to properly execute the waste treatment process is significant.

The technical facility 108 located within the outer-loop 110 receives the measured parameters from the monitored environment 148 as shown in FIG. 2. The main function of the technical facility 108 is two-fold. First, the technical facility, as part of the outer loop 110, evaluates the measured parameters to determine what effect the processing system 100 has on the surrounding environment. The second function is the dedication of a research program directed toward the innovation and development of new waste processing technology. An innovative processing technology will be necessary to satisfy future stringent environmental regulations and to train future environmental engineers. The research data accumulated by the technical facility 108 will be applied to improve and optimize the processing system 100. The end result will be an overall improvement to the environment. Thus, the technical facility 108 merges the present industrial process with technological advances which fosters the industrial process.

Figure 3:
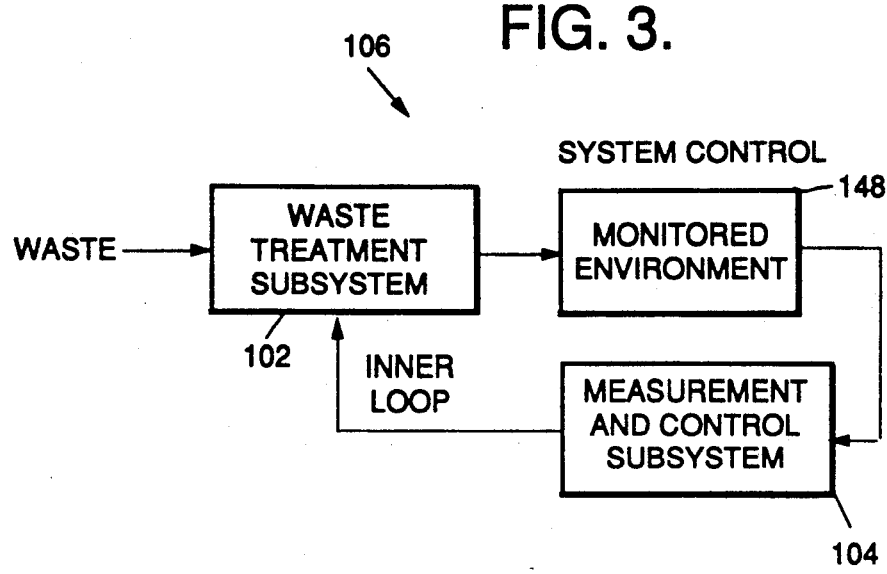
FIG. 3 is a block diagram of the inner loop of the waste treatment subsystem control of FIG. 2 showing the measurement and control subsystem connected to the waste treatment subsystem.

A block diagram of the inner loop is shown in FIGS. 3 and 4 and includes the waste treatment subsystem 102, the monitored environment 148 and the measurement and control subsystem 104. The waste treatment subsystem 102 includes the waste storage facility 118, the solid waste treatment subsystem 120, an aqueous treatment subsystem 150 and a box 152 labeled stabilization, landfill and recyclable shipping each shown in FIG. 4. The box 152 incorporates the landfill facility 124 shown in FIG. 1. Prior to transferring the received waste to the series of bins and holding tanks in the waste storage facility 118, the waste is segmented, sampled, measured, analyzed and identified to determine the basic chemistry.

Thereafter, the identified received waste is transferred to the appropriate bin or holding tank where selected parameters are monitored. For example, liquid waste transferred to a holding tank can be monitored for the flow rate into and out of the tank, volume level, static pressure and emissions from the tank. Identified solid waste can be monitored for a number of parameters including weight, mass, density and the like. The devices for monitoring the solid and liquid waste are well known in the art and can include computer controlled instrumentation. Each processing system step receives an appropriate input signal relating to air, water or soil conditions from the monitored environment 148 via the measurement and control subsystem 104 for controlling the waste treatment subsystem 102 as shown in FIG. 4.

The solid waste treatment subsystem 120 and the aqueous treatment subsystem 150 each receive as inputs, waste that has been temporarily stored in the bins or holding tanks of the storage facility 118. Upon reaching the proper mix or quantity, the waste is transmitted from storage to the solid or liquid waste treatment subsystems by, for example, pumping. The solid waste treatment subsystem 120, discussed in more detail with reference to FIGS. 5 and 6, reduces the solid waste to a residue by the known processes of incineration and biodecontamination. Thereafter, the residue is stabilized as is discussed hereinbelow.

Appropriate monitoring and control instrumentation 154 for measuring parameters of, for example, temperature, volume level, time and the like are incorporated into the solid waste treatment subsystem 120 as shown in FIG. 6. Likewise, the aqueous treatment subsystem 150 reduces the liquid waste to a residue by known processes in an aqueous treatment tank which may thereafter be permanently stored. The stabilized residue from the solid waste is then deposited in the landfill facility 124 as discussed below. Appropriate monitoring and control instrumentation 154 is also incorporated into the aqueous treatment subsystem 150 for measuring parameters such as, for example, flow rate, volume level, temperature and the like.

The residue from the solid waste treatment subsystem 120 is then stabilized as indicated in box 152. It is noted that stabilization is a necessary step only for the residue of solid waste. After the solid waste is treated by incineration or biodecontamination, stabilization is accomplished by encapsulating the residue in a concrete monolith (not shown). The purpose of the concrete monolith is to permanently isolate the solid waste residue from the environment and to prevent the residue from leeching into the soil, ground water and aquifers. The concrete is then tested to determine the degree of encapsulation and solidification of the toxic waste. If the test procedures are satisfactory, then the concrete monolith is buried in the landfill facility 124 shown in FIG. 1 or a land deposit vault (not shown) for permanent deposit.

The landfill facility 124 or land deposit vault also includes an array of measurement and testing instrumentation 156 to provide real time measuring of the leakage status of the concrete monolith. Additionally, a liner system (not shown) comprised of impermeable plastic surrounds the land deposit vault for forming a leakage collection system utilized to collect residual water from leakage in the vault. The leakage collection system includes a sump pump (not shown) to collect the leakage for later use in the stabilizing step of the process.

Figure 5:
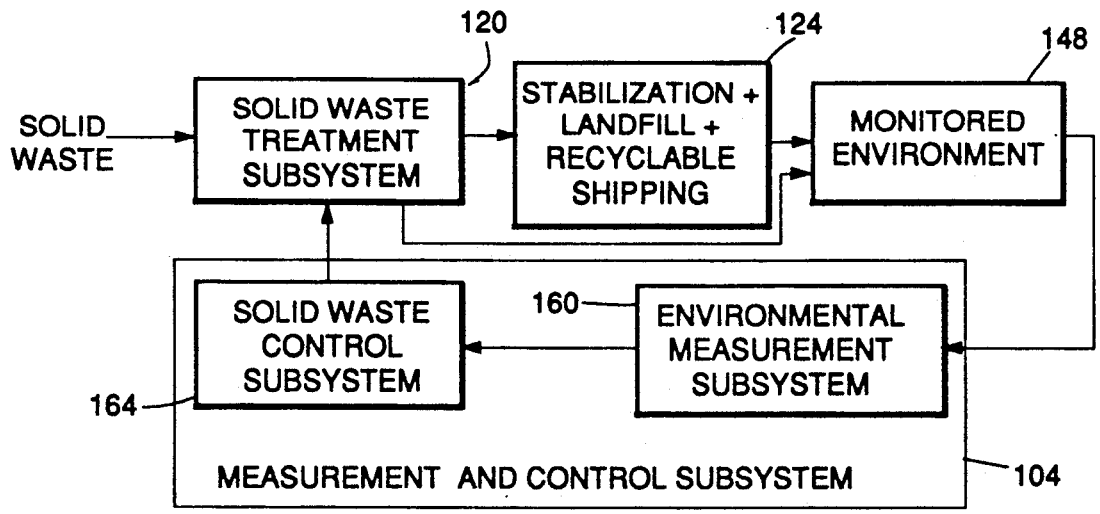
FIG. 5 is a block diagram isolating the solid waste subsystem of the waste treatment subsystem control inner loop of FIG. 2.

The measurement and control subsystem 104 which forms the feedback portion of the inner loop 106 receives signals from the monitored environment 148 indicating the condition of the air, surface and ground water and soil of the processing site 112. The measurement and control subsystem 104 includes an environmental measurement subsystem 160, an aqueous control subsystem 162, a solid waste control subsystem 164 and a landfill control 166. The environmental measurement subsystem 160 is that portion of the measurement and control subsystem 104 that receives the measured parameters from the monitored environment 148 as shown in FIGS. 4–6. For example, the leakage from the concrete monolith placed in the landfill facility 124 is measured to determine if that leakage is within the environmental regulations of composition and purity. If the permissible toxic level is exceeded, then the output residue must be reprocessed to meet the required specification or the controls of the processing system 100 must be modified to satisfy the required specification.

The environmental measurement subsystem 160 receives the monitored parameters to determine the effect of the solid waste treatment subsystem 120, the aqueous treatment subsystem 150 and the landfill facility 124 on the monitored environment. The measurement subsystem 160 thereafter transfers the monitored parameters to the appropriate control subsystems. For example, measured parameters relating to surface and ground water are directed to the aqueous control subsystem 162. Measured parameters relating to solid waste are directed to the solid waste control subsystem 164. Finally, measured parameters relating to the landfill facility 124 and the land deposit vault are directed to the landfill control 166.

Each of the aqueous control, solid waste control and landfill control subsystems 162, 164 and 166, respectively, receive the appropriate measured parameters and generate updated waste treatment control signals. The updated control signals are thereafter transmitted to the appropriate treatment subsystem. In particular, the solid waste control subsystem 164 transmits the updated solid waste control signals to the solid waste treatment subsystem 120. Likewise, the aqueous control subsystem 162 transmits the updated aqueous control signals to the aqueous treatment subsystem 150 and the landfill control 166 transmits the updated landfill control signals to the landfill facility 124. The appropriate treatment subsystems receive the updated control signals for modifying the operation of the processing system 100 to maintain the closed-loop automated waste processing system 100 at optimum efficiency. Thus, the present invention ensures that the processing system 100 will have a negligible environmental effect.

The solid waste treatment subsystem 120 of the waste treatment subsystem 102 shown in FIG. 4 has been isolated and shown in combination with the monitored environment 148 and the measurement and control subsystem 104 in FIG. 5. The solid waste is shown entering the solid waste treatment subsystem 120 from the waste storage facility 118 (shown in FIG. 4). A more detailed block diagram of the solid waste treatment subsystem 120 is shown in FIG. 6. The solid waste initially enters a material preprocessing stage 170 where the solid waste is tested, sorted and processed as necessary as, for example, by grinding to prepare the waste for a subsequent stage. Thereafter, a storage/separation stage 172 is utilized to separate and store the preprocessed waste in bins according to waste classification. Both the preprocessing and storage/separation stages can be performed by automated procedures known in the art. The output of the storage/separation stage 172 is directed to one of the three solid waste treatment methods incorporated in the waste processing system 100. Those alternative methods include an incineration stage 174, a biodecontamination stage 176 and a recyclable processing stage 178.

The incineration stage 174 includes incinerating apparatus such as an incinerator known in the art for burning various combinations of preprocessed solid waste and a catalyst such as a solvent or a gas. The output of the incineration stage 174 is a residue and a smoke emission of low pollution content. The residue can be comprised of burnt remnants of the solid waste. The smoke emission is directed to a smokestack while the residue is encased in the concrete monolith in the stabilization stage 152 as previously described. The biodecontamination stage 176 includes known apparatus such as a biodecontamination tank which fosters bacteriological processes to decompose principal toxic components into non-toxic components. The output of the biodecontamination stage 176 is a residue comprised of a non-toxic component which is thereafter stabilized during the stabilization stage 152.

The recyclable processing stage 178 incorporates the known procedure of reprocessing certain waste such as, for example, oil in slurry form. The necessary apparatus such as a chemical treatment tank is included in which the waste product is deposited to remove a water component from the waste slurry. The remaining waste oil is then reprocessed for future reuse and then transmitted to a temporary storage shipping tank 180. The reprocessed and reusable waste product (e.g., oil) is thereafter transferred to a recyclable shipping stage which, for convenience, is shown in FIG. 6 as part of the landfill facility 124. The reprocessed waste product is then distributed for future reuse.

Thereafter, the parameters of each of the environmental elements of air, surface and ground water and soil are tested in the monitored environment 148. The monitored parameters are then transmitted to the environmental measurement subsystem 160 for measurement and evaluation. The measured and evaluated parameters are then sent to the solid waste control subsystem 164 which generates the updated solid waste control signal. The updated solid waste control signal is transmitted to each of the measurement and control instrumentalities 154 as shown in FIG. 6. In particular, the updated control signal is transmitted to the measurement and control instrumentalities 154 associated with the material preprocessing stage 170, the storage/separation stage 172, the incineration stage 174 and the recyclable processing stage 178. Note that each measurement and control instrumentality 154 delivers the updated control signals to each of the above recited stages and also forms a feedback loop with the respective stage. The feedback loop provides a feedback signal which further updates the control signal received from the solid waste control subsystem 164. Similar control features also exist for both the aqueous treatment subsystem 150 and the landfill facility 124.

The present invention employs a monitoring and control architecture capable of monitoring and controlling the entire closed-loop waste processing system 100 in an automated manner. Further, the inner and outer loops 106, 110 each contribute to providing an environmentally optimal waste processing system which can utilize advanced sensors including remote sensors via satellite monitoring (not shown). Further, statistical process control methods are employed to accurately monitor the system states and the environmental effect. Also, advanced systems engineering methodology and technology are utilized to ensure that system processes are controllable for near zero environmental impact. The emissions from the incineration stage 174 are measured by an advanced emissions sensor (not shown) and novel techniques are employed for emissions monitoring. Each of these novel elements will be the subject matter disclosed in future patent applications.

Thus, the present invention has been described herein with reference to a particular embodiment for a particular application. Those having ordinary skill in the art and access to the present teachings will recognize additional modifications, applications and embodiments within the scope thereof. Although the detailed description is directed to a close-loop automated waste processing system, the present invention is equally applicable to other technologies such as gasoline production.

It is therefore intended by the appended claims to cover any and all such modifications, applications and embodiments within the scope of the present invention.

Accordingly,

What is claimed is:

1. A closed-loop automated system for controlling an industrial process comprising:
    first means for receiving and analyzing an element to be processed;
    second means for processing and converting said element into a residue;
    third means for stabilizing and storing said processed residue to prevent physical interaction therewith;
    fourth means for monitoring a plurality of parameters of said residue and the environment surrounding said closed-loop system to provide a plurality of control signals; and
    fifth means for utilizing said control signals to control each stage of said closed-loop system for providing a negligible environmental effect.

2. The closed-loop automated system of claim 1 wherein said first means comprises a plurality of storage tanks and bins.

3. The closed-loop automated system of claim 1 wherein said second means comprises an incinerator.

4. The closed-loop automated system of claim 1 wherein said second means comprises a biodecontamination tank.

5. The closed-loop automated system of claim 1 wherein said third means includes a landfill facility for storing said processed residue.

6. The closed-loop automated system of claim 1 wherein said third means includes a permanent storage facility for depositing said stabilized processed residue.

7. The closed-loop automated system of claim 1 wherein said fourth means comprises a plurality of monitoring and control instruments.

8. The closed-loop automated system of claim 1 wherein said fifth means comprises a plurality of control subsystems for controlling the operation of said closed-loop automated system.

9. A closed-loop system for processing waste comprising:
    first means for receiving and analyzing said waste;
    second means for processing and converting said waste into a residue;
    third means for stabilizing and storing said processed waste residue to prevent physical interaction therewith;
    fourth means for monitoring a plurality of parameters of said residue and the environment surrounding said closed-loop system to provide a plurality of control signals; and
    fifth means for utilizing said control signals to control each stage of said closed-loop system for providing a negligible environmental effect.

10. The closed-loop system for processing waste of claim 9 wherein said second means for processing and converting said waste into a residue comprises an incinerator.

11. The closed-loop system for processing waste of claim 9 wherein said second means for processing and converting said waste into a residue comprises a biodecontamination tank.

12. A method for controlling a closed-loop processing system, said method comprising the steps of:
    receiving and analyzing an element to be processed by said closed-loop processing system;
    processing and converting said element into a residue;
    stabilizing and storing said processed residue to prevent physical interaction therewith;
    monitoring a plurality of parameters of said residue and the environment surrounding said closed-loop system to provide a plurality of control signals; and
    utilizing said control signals to control each stage of said closed-loop system for providing a negligible environmental effect.

13. The method for controlling the closed-loop processing system of claim 12 wherein said step of receiving said element to be processed further includes the step of temporarily storing said element in a plurality of tanks and bins.

14. The method for controlling the closed-loop processing system of claim 12 wherein said steps of processing and converting said element into a residue further includes the step of treating industrial waste.

15. The method for controlling the closed-loop processing system of claim 14 further including the step of preprocessing said waste for preparing said waste to be treated and converted into said residue.

16. The method for controlling the closed-loop processing system of claim 14 wherein said step of treating said waste further includes the step of incinerating said waste for converting said waste into said residue.

17. The method for controlling the closed-loop processing system of claim 14 wherein said step of treating said waste further includes the step of biodecontaminating said waste for converting said waste into said residue.

18. The method for controlling the closed-loop processing system of claim 14 wherein said step of treating said waste further includes the step of chemically treating said waste for converting said waste into said residue.

19. The method for controlling the closed-loop processing system of claim 12 wherein said step of storing said processed residue further includes the step of depositing said stabilized processed residue in a permanent storage facility.

20. The method for controlling the closed-loop processing system of claim 19 further including the step of testing said permanent storage facility for leakage.

* * * * *